(12) United States Patent
Chen et al.

(10) Patent No.: US 7,785,547 B2
(45) Date of Patent: Aug. 31, 2010

(54) APPARATUS AND METHOD FOR INCREASING THE CONCENTRATION OF RECYCLED HYDROGEN IN A HIGH PRESSURE HYDROGENATION REACTOR

(75) Inventors: Guangjin Chen, Beijing (CN); An Ma, Beijing (CN); Lijun Yan, Beijing (CN); Xuqiang Guo, Beijing (CN); Changyu Sun, Beijing (CN); Xiulin Wang, Beijing (CN)

(73) Assignees: PetroChina Company Limited (CN); China University of Petroleum Beijing (CN)

( * ) Notice: Subject to any disclaimer, the term of this patent is extended or adjusted under 35 U.S.C. 154(b) by 350 days.

(21) Appl. No.: 11/977,426

(22) Filed: Oct. 23, 2007

(65) Prior Publication Data
US 2008/0112862 A1    May 15, 2008

(30) Foreign Application Priority Data
Oct. 26, 2006    (CN) ......................... 2006 1 0150085

(51) Int. Cl.
*C10G 49/22*    (2006.01)
*B01D 53/00*    (2006.01)

(52) U.S. Cl. ...................... 422/189; 422/198; 208/103; 96/243

(58) Field of Classification Search ................. 422/198, 422/189; 585/15; 95/149, 187; 96/243; 261/115; 208/103; 423/658.3
See application file for complete search history.

(56) References Cited

U.S. PATENT DOCUMENTS

| | | | | |
|---|---|---|---|---|
| 4,553,981 A | * | 11/1985 | Fuderer | 48/62 R |
| 4,842,622 A | * | 6/1989 | Wamsley, Jr. | 96/406 |
| 5,082,551 A | | 1/1992 | Reynolds et al. | |
| 5,434,330 A | * | 7/1995 | Hnatow et al. | 585/864 |
| 2005/0277801 A1 | | 12/2005 | Chen et al. | |
| 2006/0089519 A1 | * | 4/2006 | Stell et al. | 585/648 |

FOREIGN PATENT DOCUMENTS

EP    0061259    9/1982

OTHER PUBLICATIONS

International Search Report- Apr. 17, 2008.

* cited by examiner

*Primary Examiner*—Walter D Griffin
*Assistant Examiner*—Renee Robinson
(74) *Attorney, Agent, or Firm*—Sofer Haroun, LLP

(57) ABSTRACT

An apparatus and a method that increase the concentration of recycled hydrogen in the hydrogenation unit are disclosed having a hydration separation unit included between the high-pressure separator and hydrocracking reactor. A part of the recycled hydrogen contacts with the water-in-oil microemulsion to form hydrates from which the light hydrocarbon components are removed. The gas flow entering into the hydration separation unit is present in amount of 20%~100% of the total gas flow coming from the high-pressure separator; the water-in-oil microemulsion, in which the volume ratio of oil and water is 1:1 to 5:1 may increase hydrogen partial pressure in the reactor and thus upgrade the performance of hydrogenation.

3 Claims, 4 Drawing Sheets

APPARATUS AND METHOD FOR INCREASING THE CONCENTRATION OF RECYCLED HYDROGEN IN A HIGH PRESSURE HYDROGENATION REACTOR

RELATED APPLICATION

This application claims the benefit of priority from Chinese Patent Application No. 2006 10150085.7, filed on Oct. 26, 2007, the entirety of which is incorporated herein by reference.

FIELD OF THE INVENTION

The present invention relates to an apparatus and a method that can, by forming hydrates, increase the concentration of recycle hydrogen in a hydrogenation reactor, so as to increase the hydrogen partial pressure in the reactor, improve the performance of hydrogenation, reduce the cost of equipment and power consumption, and avoid the problem of hydrogen purge.

BACKGROUND OF THE INVENTION

Figure 5:
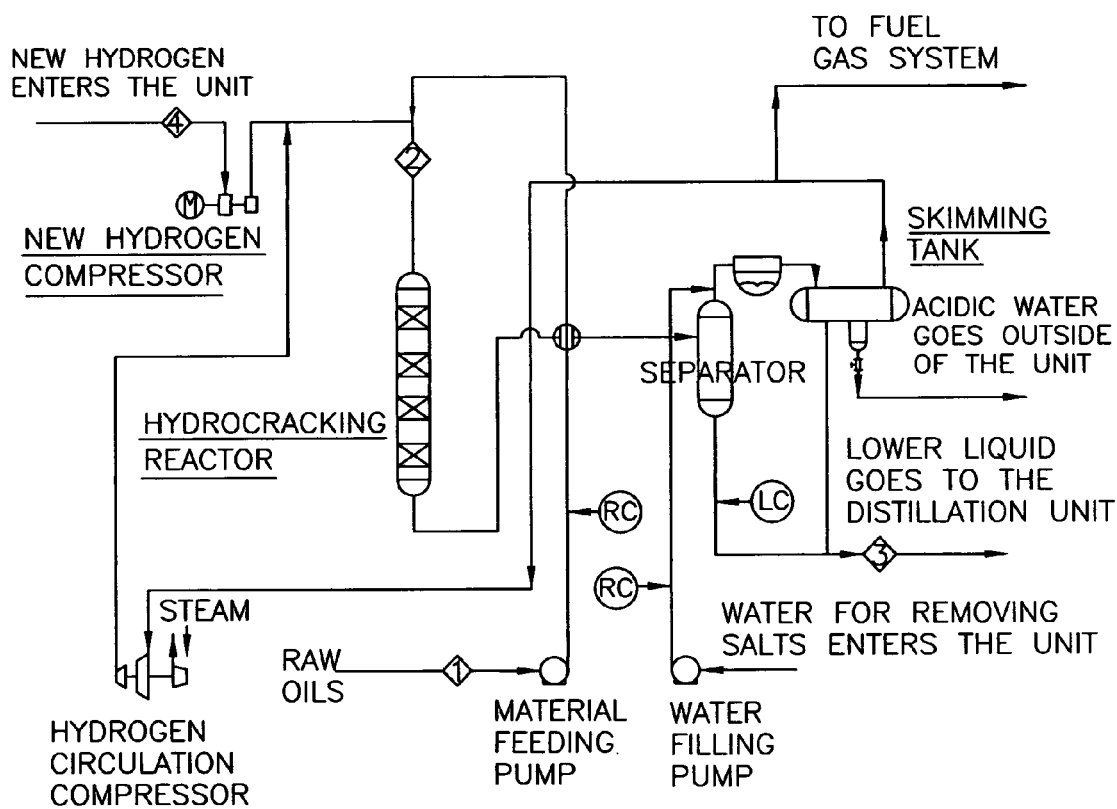

Hydrogen is an essential material of the hydrogenation process, especially hydrocracking process in refinery, and its purity exerts a tremendous influence on the manufacturing and operating expenses of the hydrogenation unit as well as other reaction performances including the yield of the target products and the operational cycle of catalysts. The process of conventional high-pressure hydrocracking is illustrated in FIG. 5, from which it can be seen that the purity of hydrogen entering into the reactor is dependent on the purity of new hydrogen and the purity of recycle hydrogen. Light hydrocarbon components, methane for example, which are produced during the process of hydrogenation, may be accumulated and thus decrease the purity of recycle hydrogen as they cannot be effectively separated from the recycle hydrogen in the high-pressure separator. A conventional solution for solving the problem is to release part of the recycle hydrogen and at the same time supplement some new hydrogen with high purity so as to keep the concentration of recycle hydrogen at a level such as about 85%. If the concentration of recycle hydrogen in the high-pressure separator can be effectively increased to over 95%, then hydrogen release would be avoided; meanwhile a significant economic benefit can be achieved. For newly established equipment, the designing pressure of its devices can be decreased due to the increased concentration of recycle hydrogen. In the case that the partial pressure of hydrogen needed by the reaction is fixed, the increase of the concentration of hydrogen can decrease the whole reacting pressure and therefore lower the equipment investment of the whole reaction system comprising reactor(s), heating oven(s), heat exchanger(s), cooler(s), high pressure separator(s) and pipes & lines, etc. After the concentration of recycle hydrogen is increased and the total operating pressure of the hydrogenation reactor is decreased, both the lift head of the adapted pump and the compression ratio of the compressor are lowered, and thus the cost of the equipment is cut down. For the equipment that is already under operation, the increase of the concentration of the recycle hydrogen is able to improve the production capacity of the whole reaction system, and it is an important measure of renovation to equipment whose production capacity is to be increased. Additionally, the increase of the hydrogen partial pressure can raise the removal ratio of sulphur and nitrogen, and thus boost the transformation efficiency of raw oil and augment the yield of light oils (gasoline, kerosene, etc.).

Currently, in the state-of-the-art of the pressure swing absorption technology (PSA), its low operation pressure is not suitable for the hydrocracking unit because generally, the pressure of the recycle hydrogen in it is very high. Membrane separation technology, another technology for separation of gas mixtures, is suitable for the separation of high pressure gases, but the pressure of the obtained hydrogen is too low and to solve the problem, before entering the hydrocracking reactor, it should be pressurized hugely and therefore, more energy is consumed, making the technology not so ideal either.

SUMMARY OF THE INVENTION

The object of the present invention is, taking advantages of the hydration method, namely, to fit high pressure operation and not substantially decreasing the pressure of the concentration-increased hydrogen, to increase the concentration of the recycle hydrogen in middle and high pressure hydrogenation units and lower the total reacting pressure so as to cut down the facility investment and boost the production capacity of the whole reacting system comprising reactor(s), heating oven(s), heat exchanger(s), cooler(s), high pressure separator(s) and pipes & lines, and to improve the removal ratio of sulphur and nitrogen, raise the transformation efficiency of raw oils as well as the yields of light oils (gasoline, kerosene, etc.).

For realizing said object, the present invention provides an apparatus for increasing the concentration of recycle hydrogen in the high pressure hydrogenation unit comprising a hydrocracking reactor and a high pressure separator, the outlet of said hydrocracking reactor being fluid-connected with the inlet of said high pressure separator, the outlet of said high pressure separator being fluid-connected with the inlet of said hydrocracking reactor forming a fluid flow-loop, wherein a hydration separation unit is introduced in the path of the fluid flow from said high pressure separator to the hydrocracking reactor, said hydration separation unit comprising a hydration reactor into which a water-in-oil microemulsion is introduced whereby the light hydrocarbon components (methane, ethane, etc.) of the gas mixture from said high pressure separator are combined in said water-in-oil microemulsion; and a hydrate decomposer being connected with said hydration reactor to form a fluid flow-loop and releasing the light hydrocarbon components from said microemulsion which integrates said light hydrocarbon components.

According to the present invention, hydration method for the separation of gas mixtures has the similar principle with condensation method. In condensation method the mixtures are separated via the composition difference between the equilibrium gas and liquid phases, but in hydration method the separation of gas mixture is realized via the composition difference between the equilibrium gas and solid phases. For instance, after methane and ethane react with water so as to form solid hydrates, the mole fraction (dry basis) of ethane in the hydrate phase is more than in the feeding gas, while the mole fraction of methane in the gas phase is more than in the feeding gas.

Separation of hydrogen by hydration method is of special significance as hydrogen is one of the few micromolecular gases that cannot form hydrates in moderate conditions.

Besides a certain amount of hydrogen, dry refinery gas mainly contains methane, ethane, ethene and nitrogen etc., all of them, in contrast to hydrogen, can form hydrates. When the dry gas contacts with water, components excluding hydrogen, under appropriate conditions, will react with water and form hydrates, and in this way, the hydrogen in the gas phase is concentrated and a fairly high recovery ratio can be achieved. The degree of the concentration of the hydrogen is dependent on temperature and pressure: generally, the lower the temperature is and the higher the pressure is, the more hydrate forming gases will participate in the hydration and is thus removed and the larger the degree of concentration of hydrogen will be achieved. However, as the freezing point of water is 0° C., the range for temperature regulation is narrow, generally between 0° C. and 5° C.; as a result, the increase of the concentration of hydrogen is realized principally by increasing the hydration pressure.

The inventor also found that hydration method could be operated under high pressures while would not substantially decrease the pressure of the concentration-increased hydrogen, so it is quite suitable for the increase of the concentration of hydrogen in the high pressure hydrogenation unit.

In a preferred embodiment of the apparatus for increasing the concentration of recycle hydrogen in high pressure hydrogenation unit in accordance with the present invention, said hydration reactor is constructed with a combination of a mist spray area and sieve plates area, the upper part of said hydration reactor being the mist spray area which is equipped with a sprayer for spurting out the water-in-oil microemulsion and a set of serpentine cooling pipes, and the lower part of said hydration reactor being the sieve plate area equipped with multiple layers of sieve plates.

In a preferred embodiment of the apparatus for increasing the concentration of recycle hydrogen in high-pressure hydrogenation unit in accordance with the present invention, the upper part of the internal of said hydrate decomposer is equipped with wire mesh demisters.

In a preferred embodiment of the apparatus for increasing the concentration of recycle hydrogen in high pressure hydrogenation unit in accordance with the present invention, said high pressure separator is connected with a raw gas inlet at the lower part of the sieve plate area of the hydration reactor via a first heat exchanger; a hydrate slurry outlet at the bottom part of the hydration reactor is connected with a hydrate slurry inlet of the hydrate decomposer via said first heat exchanger and a secondary heat exchanger; an outlet of hydrogen with high concentration at the top of the hydration reactor is connected with a recycle hydrogen compressor; an outlet of water-in-oil microemulsion at the bottom of the hydrate decomposer is connected with a sprayer inlet of water-in-oil microemulsion at the top part of the hydration reactor via a third heat exchanger and a booster pump; and the top part of the hydrate decomposer is connected with a fuel gas system.

The present invention also provides a method for increasing the concentration of recycle hydrogen in a high pressure hydrogenation reactor using the apparatus mentioned above, the method comprises the following steps of:

making a part of the gas mixtures which contain hydrogen and come from a high pressure separator passing through the first heat exchanger and exchanging heat with the hydrate slurry coming from the hydration reactor of the hydration separation unit and, after pre-cooled to 1-10° C., entering into the hydration reactor from the lower part of the hydration reactor and passing upwardly through the hydration reactor;

making a contact between the gas mixtures containing hydrogen and the water-in-oil microemulsion which passes downwardly through the hydration reactor, thereby the light hydrocarbon components of the gas mixtures containing hydrogen are formed hydrates that thus removed from the gas mixtures containing hydrogen, the heat generated from the reaction being taken away by the cooling pipes installed inside the hydration reactor, the evaporating temperature of the cryogens in the cooling pipes ranging −3 to −5° C.; after the reaction, the concentration of the hydrogen in the gas mixtures being increased, and the gas mixtures with increased concentration of hydrogen leaving from the top of the hydration reactor and entering into the circulation compressor with another part of the mixture gases which contain hydrogen and come from the high pressure separator;

making a water-in-oil microemulsion and a generated hydration product to leave the hydration reactor from the bottom thereof in the form of hydrate slurry, primarily heating the hydrate slurry via the first heat exchanger through heat exchange with the gas mixtures containing hydrogen coming from the high pressure separator, further heating the hydrate slurry via the secondary heat exchanger and then entering into a hydrate decomposer, and dividing the hydrate slurry in the hydrate decomposer into a gas flow and a liquid flow, wherein the gas flow containing the light components is released from the top of the hydrate decomposer and sent to the fuel gas system; the liquid flow containing the water-in-oil microemulsion is reused after flowing through the booster pump and returning to the hydration reactor.

In a preferred embodiment of the method for increasing the concentration of recycle hydrogen in the high pressure hydrogenation unit in accordance with the present invention, the operating pressure of the hydration reactor is the pressure of gas coming from the high-pressure separator, and the operating temperature is 1-10° C.; the operating pressure of the hydrate decomposer is 0.2-2 MPa, and the operating temperature is 5-25° C.

In a preferred embodiment of the method for increasing the concentration of recycle hydrogen in the high pressure hydrogenation unit in accordance with the present invention, the gas flow entering into the hydration separation unit is present in amount of 20%~100% of the total gas flow coming out from the high pressure separator.

In a preferred embodiment of the method for increasing the concentration of recycle hydrogen in the high-pressure hydrogenation unit in accordance with the present invention, the volume ratio of oil phase and water phase in the water-in-oil microemulsion ranges from 1:1 to 5:1.

In a preferred embodiment of the method for increasing the concentration of recycle hydrogen in the high-pressure hydrogenation unit in accordance with the present invention, the oil phase in said water-in-oil microemulsion comprises diesel oil, kerosene or non-water-soluble alkanes.

In a preferred embodiment of the method for increasing the concentration of recycle hydrogen in the high pressure hydrogenation unit in accordance with the present invention, 10%-40% of tetrahydrofuran is added into the water phase based on the mass concentration or 20%-50% of cyclopentane is added into the oil phase based on the mass concentration before mixing water phase and oil phase to prepare the water-in-oil microemulsion.

Now the details and advantageous of the apparatus and the method in accordance with the present invention will be illustrated with exemplary embodiments and examples by referring to the accompanying figures.

DETAILED DESCRIPTION OF THE DRAWINGS

Figure 1:
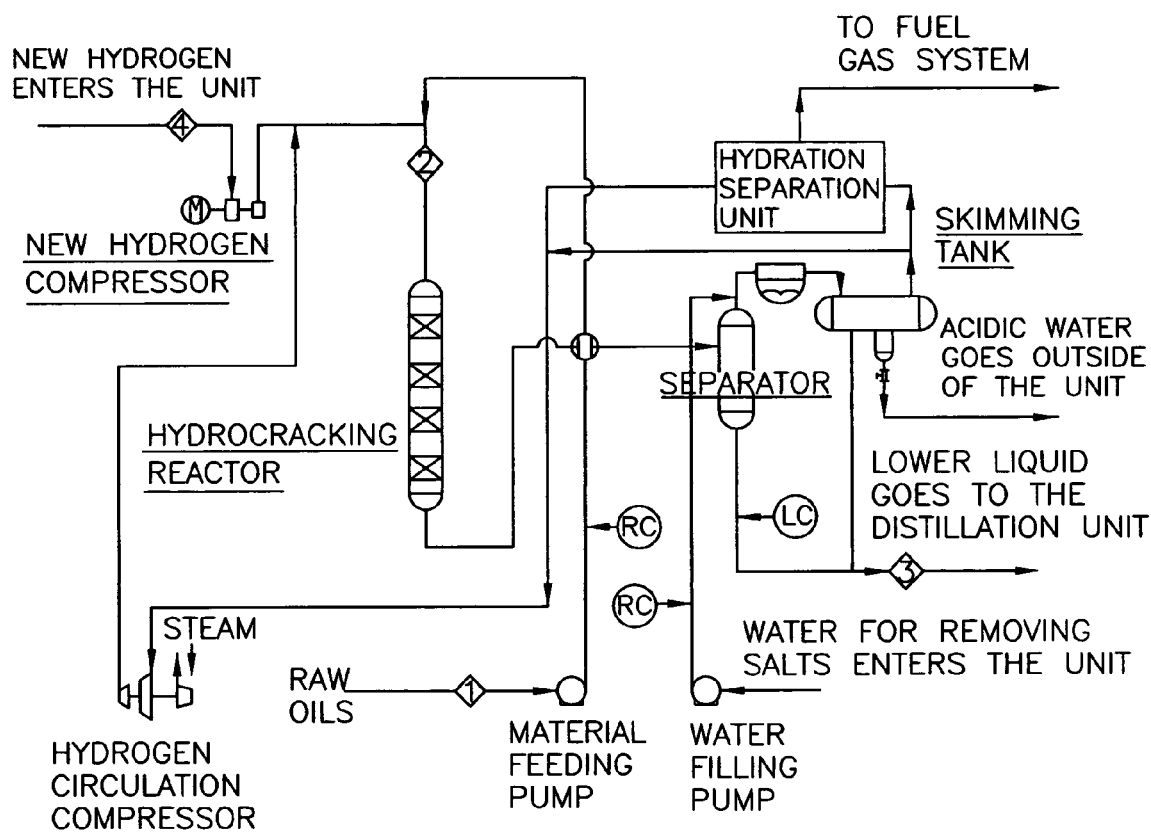
Figure 2:
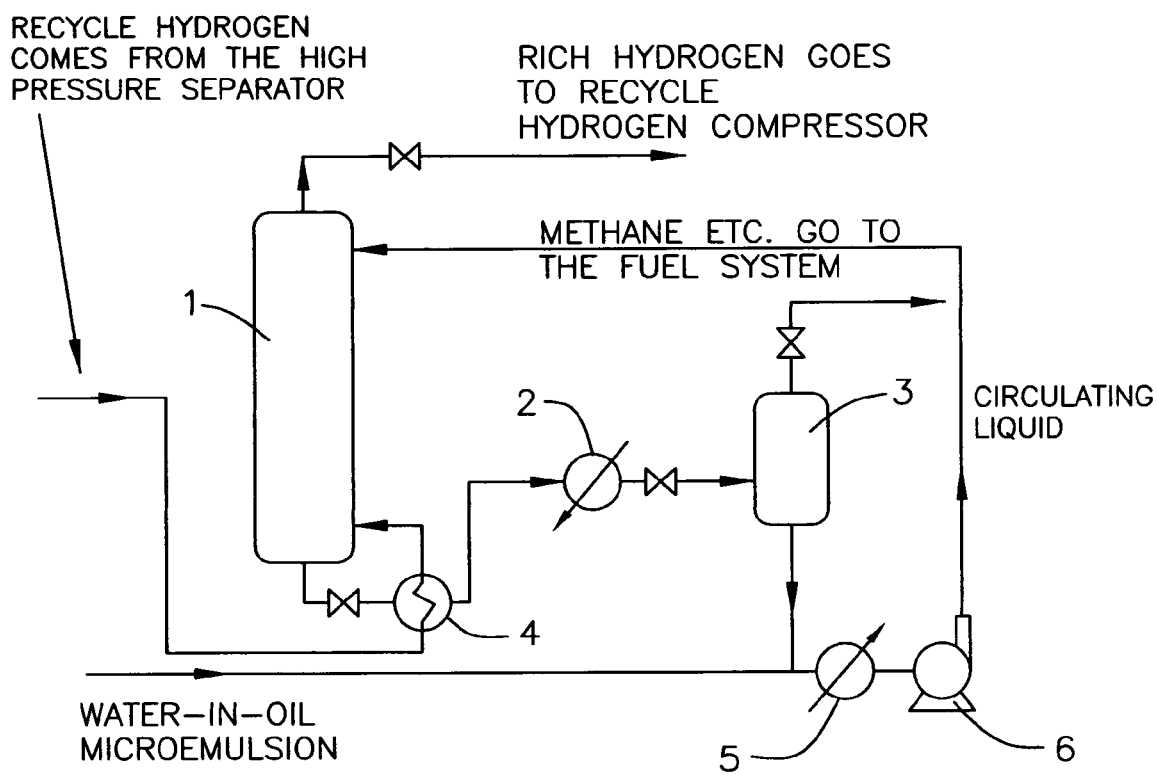
Figure 3:
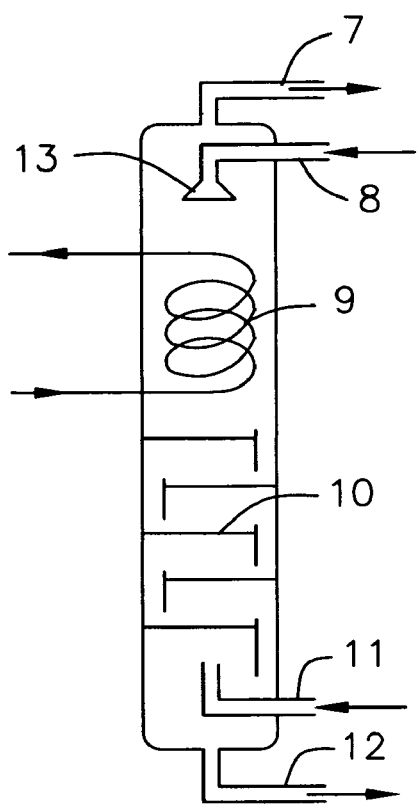
Figure 4:
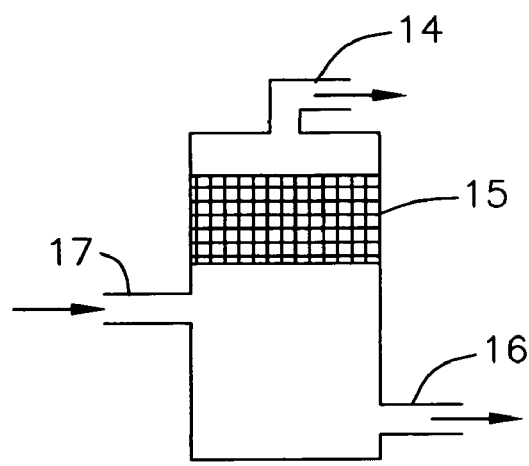

FIG. 1 indicates a schematic layout of the method and process for the increase of the concentration of recycle hydrogen in the high-pressure hydrogenation unit in accordance with the present invention;

FIG. 2 indicates a schematic layout of the operating principle and process of the hydration separation unit in accordance with the present invention;

FIG. 3 indicates a structural diagram of the hydration reactor in the present invention;

FIG. 4 indicates a structural diagram of the hydrate decomposer in the present invention;

FIG. 5 indicates technological process of the hydrogenation unit in conventional hydrocracking equipment.

| Notations and Descriptions for the numerals | |
|---|---|
| 1: Hydration reactor | 2: Heat exchanger |
| 3: Hydrate decomposer | 4: Heat exchanger |
| 5: Heat exchanger | 6: Booster pump |
| 7: Outlet of hydrogen with high concentration | 8: Water-in-oil microemulsion inlet |
| 9: Serpentine cooling pipes | 10: Sieve plates |
| 11: Raw gas inlet | 12: Hydrate slurry outlet |
| 13: Sprayer | 14: Outlet at the top |
| 15: Wire mesh demisters | 16: Water-in-oil microemulsion outlet |
| 17: Hydrate slurry inlet | |

DETAILED DESCRIPTION OF THE INVENTION

As illustrated in the drawings, the present invention provides an apparatus for increasing the concentration of recycle hydrogen in a high-pressure hydrogenation unit. The hydrogenation unit comprises a hydrocracking reactor and a high pressure separator, wherein the outlet of said hydrocracking reactor is arranged in fluid-connection with the inlet of said high pressure separator, the outlet of said high pressure separator is fluid-connected with the inlet of said hydrocracking reactor forming a fluid flow-loop.

The apparatus in accordance with the present invention is characterized in that a hydration separation unit is introduced in the path of the fluid flow from said high pressure separator to the hydrocracking reactor, said hydration separation unit comprising a hydration reactor 1 into which a water-in-oil microemulsion is introduced whereby the light hydrocarbon components (methane, ethane, etc.) are integrated into said water-in-oil microemulsion by forming hydrate; and a hydrate decomposer 3 is connected with said hydration reactor to form a fluid flow-loop for releasing the light hydrocarbon components from said microemulsion which combines with said light hydrocarbon components.

In other words, a hydration separation unit that contains hydration reactor 1 and hydrate decomposer 3 is arranged between the hydrocracking reactor and the high-pressure separator. The temperature of a part of the recycle hydrogen coming from the high-pressure separator is decreased to 1-10° C. and then that part of hydrogen goes into the hydration separation unit and contacts with the water-in-oil microemulsion. The concentration of the hydrogen is increased by forming hydrates and removing the light hydrocarbon components including methane. The hydrogen whose concentration is increased leaves the hydration separation unit and mixes with another part of the hydrogen coming from the high pressure separator to form the recycle hydrogen, which returns to a hydrocracking reactor through a circulation compressor and maintains the concentration of hydrogen and the partial pressure of hydrogen in the reactor at a high level.

In the hydration separation unit, the operating pressure of the hydration reactor is the pressure of the gases coming from the high-pressure separator, and the operating temperature is 1-10° C.; the operating pressure of the hydrate decomposer is 0.2-2 MPa, and the operating temperature is 5-25° C. The flux ratio of the watery circulating liquid flow and the gas flow in the hydration reactor is 1:50 to 1:200 in standard volume ratio. The flux ratio of the watery circulating liquid flow and the gas flow is dependent on the pressure of the gas, the higher the pressure is, the lower the flow rate of the circulating liquid is; in contrast, the lower the pressure is, the higher the flow rate of the circulating liquid is.

According to the present invention, it is proposed that the gas flow entering into the hydration separation unit (or hydration concentration-increasing unit) is taken in amount of 20%~100% of the total gas flow coming out from the high pressure separator.

In practice, the proportion should be set according to the degree of the concentration decrease of the recycle hydrogen after passing through the hydrocracking reactor one time: the greater the degree of the concentration decrease is, the higher the proportion of the gas entering into the hydration separation unit should be. Conducive to the increase of the concentration of recycle hydrogen though, 100% of gas entering into the hydration separation unit will dramatically increase the burden of it (for in general, the flow rate of recycle hydrogen for hydrogenation is as large as 200,000-300,000 standard m³/h), and would not be cost-effective. It's enough as long as the molar concentration of hydrogen in the mixed gases of hydrogen whose concentration has been increased by entering into the hydration separation unit and gases whose concentration are not increased by entering the unit can reach 93-95% (see examples). The following formula may be referred to determine the percent of gases entering into the hydration separation unit:

$$m = \frac{0.94 - y}{0.97 - y} \times 100\%$$

wherein y represents the mole fraction of hydrogen in the gases coming from the high pressure separator.

A key technical point of the present invention is the substitution of simple water solution by water-in-oil microemulsion. By using the water-in-oil microemulsion, the quantity of hydrate formed can be effectively controlled, and the hydrate particles can be prevented from agglomerating and thus plugging of the equipment can be prevented. The total volume fraction of the formed hydrates is preferably not more than 30% in the hydrate slurry so as to guarantee the favorable fluidity of the hydrate slurry. Moreover, continuous oil phase has certain absorptive function to light hydrocarbon components, especially heavier ones such as ethane and propane, and can remove some of them from gas phase, and consequently, reduces the hydration load and correspondingly, the cool load during the hydration. Also, experimental tests shows that the application of water-in-oil microemulsion, in which the volume ratio of oil phase and water phase ranges from 1:1 to 5:1 and the oil phase can be diesel oil, kerosene or other non-water-soluble alkanes, can significantly accelerate the hydrate formation rate.

Another key technical point of the present invention is the addition of a certain amount of tetrahydrofuran into water solution or a certain amount of cyclopentane into oil to reduce the formation pressure of hydrate, especially the partial pressure required for methane to form hydrate so as to remove methane effectively. Addition of diesel oil or kerosene, which has low volatility and can dissolve and dilute tetrahydrofuran or cyclopentane considerably, can effectively cut down the evaporation loss of tetrahydrofuran or cyclopentane. The adoption of tetrahydrofuran involves the preparation of its water solution at first in which the tetrahydrofuran is taken in amount of 10-40% of mass concentration and then the preparation of microemulsion with the solution and oil according to said volume ratio; the adoption of cyclopentane involves the preparation of its oil solution at first in which the cyclopentane is taken in amount of 20-50% of mass concentration and then the preparation of microemulsion with the solution and water according to said volume ratio.

The present invention also provides a method by using said apparatus for increasing the concentration of the recycle hydrogen in the high-pressure hydrogenation unit. The method comprises the following steps of:

making a part of gas mixtures which contain hydrogen and come from the high pressure separator passing through the first heat exchanger 4 and exchanging heat with the hydrate slurry coming from a hydration reactor 1 of the hydration separation unit and, after precooled to 1-10° C., entering into the hydration reactor 1 from the lower part of the hydration reactor 1 and passing upwardly through the hydration reactor 1;

making a contact reaction between the gas mixtures containing hydrogen and the water-in-oil microemulsion which passes downwardly through the hydration reactor 1, thereby the light hydrocarbon components of the gas mixtures containing hydrogen are combined into hydrates and thus removed from the gas mixtures containing hydrogen, the heat generated from the reaction being taken away by the cooling pipes 9 installed inside the hydration reactor 1, wherein the evaporating temperature of the cryogens in the cooling pipes 9 is −3 to −5° C.; after the reaction, the concentration of the hydrogen in the gas mixtures is increased, and the gas mixtures with increased concentration of hydrogen left from the top of the hydration reactor 1 and enters into the circulation compressor with another part of the mixture gases which contain hydrogen and come from the high pressure separator;

making a water-in-oil microemulsion and the formed hydrates to leave the hydration reactor 1 from the bottom thereof in the form of hydrate slurry, primarily heating the hydrate slurry by said first heat exchanger 4 through heat exchange with the gas mixtures containing hydrogen coming from the high pressure separator, further heating the hydrate slurry by the secondary heat exchanger 2 and then entering into a hydrate decomposer 3, and decomposing the hydrate slurry in the hydrate decomposer 3 into two flows: a gas flow and a liquid flow, wherein the gas flow containing the light components is released from the top of the hydrate decomposer 3 and sent to the fuel gas system; the liquid flow containing the water-in-oil microemulsion is reused after flowing through the booster pump 6 and returning to the hydration reactor.

To put it another way, the technical process of the hydration separation unit is as follows:

The gas mixtures containing hydrogen pass through the tube passes of the shell and tube heat exchanger 4 and exchange heat inversely with the hydrate slurry flowing through the shell passes of the heat exchanger 4. After precooled, the gas mixtures enter into the hydration reactor 1 from its bottom and contact with the water-in-oil microemulsion flowing from top to bottom. Then hydrates are produced with the light hydrocarbon components (including methane etc.) contained in the gas mixtures. In the gas mixtures treated as the above method, the content of hydrogen is raised, or the concentration of the hydrogen is increased. The concentration-increased hydrogen leaves the hydrate separation unit from the top of the hydration reactor 1 and enters into the circulation compressor; the remaining microemulsion and the generated hydrates are discharged from the bottom of the hydration reactor 1 in the form of slurry and pass in order through a butterfly valve, where the pressure is reduced to 3-4 MPa, the shell passes of the shell and tube heat exchangers 4 and 2, where the slurry exchanges heat with the raw gases (gas mixtures containing hydrogen, the temperature is higher) and hot water and is heated to 15-25° C., another butterfly valve, where the pressure is reduced to 0.2-2 MPa, and the hydrate decomposer 3, where the slurry is divided into two flows: a gas flow (e.g., methane etc.) which is discharged from the top of the decomposer and leaves the hydration separation unit, and a liquid flow, which, after passing through the shell passes of the shell and tube heat exchanger 5, is cooled to 1-10° C. and reused after flowing through the booster compressor 6 and returning to the hydration reactor 1.

The dominating devices of the hydration separation unit are hydration reactor 1 and hydrate decomposer 3, whose structures are respectively as follows:

A combined structure of a mist spray and sieve plates is applied in hydration reactor 1, the upper part of which is the mist spraying area, and the lower part of which is the sieve plates area. The hydration is primarily completed in the mist spray area. Heat generated in the reaction is taken away by internal serpentine cooling pipes 9 where the evaporating temperature of the cryogens in the cooling pipes is −3 to −5° C. The functions of the sieve plates area is to make the hydrate slurry formed in the mist spray area contact with the ascending gases and carry out mass transfer so that the hydrogen in the slurry could be extracted to improve the recovery ratio of hydrogen.

The internal upper part of hydrate decomposer 3 is equipped with wire mesh demisters 15.

Other devices of the hydration separator include three heat exchangers 2, 4 and 5, a booster pump 6, a refrigerator which may use ammonia, Freon or propane as cryogen, not shown in the figures) and several valves, tubes and lines. All the heat exchangers are shell and tube countercurrent heat exchangers. The tube passes of heat exchanger 2 is for the passing of hot water with the inlet temperature of hot water between 30° C. and 40° C.; the shell passes of heat exchanger 2, as is the same with those of heat exchanger 5, is for the passing of hydrate slurry; the tube passes of heat exchanger 5 is for the passing of cryogens whose evaporating temperature is −3 to −5° C. booster pump 6 is a volume measuring pump.

In summary, the method of the present invention makes that: a part of the gases (gas mixtures containing hydrogen) from the high pressure separator, after cooled to 1-10° C., enter into the hydration separation unit, wherein the gases (gas mixtures containing hydrogen) contact with a water-in-oil microemulsion and generate hydrates and in this way, light hydrocarbon components such as methane etc. are removed to increase the concentration of hydrogen to 96-98% (V, volume percentage) or even more. The gases containing concentration-increased hydrogen, i.e. gases in which the concentration of hydrogen is increased, away from the hydration separation unit are mixed with another flow of gases to serve as the recycle hydrogen, which returns to a hydrocracking reactor through a circulating compressor. The concentration of the recycle hydrogen reaches 93-95% or even higher, keeping the concentration and the partial pressure of hydrogen at high levels, and leading to much less energy consumption, improvement of the hydration performance and larger economic benefits. The method is particularly suitable for hydrocracking unit, and can also be applied on equipments for the synthesis of ammonia and for the production of methanol with synthesized gases. The inventor contemplates that the method will pave the way for the successful separation of hydrogen and can also be extended for the separation of other light gases, such as separation of C1 and C2.

Example 1

Between a high-pressure separator and a hydrocracking reactor a hydration separation unit comprising a hydration reactor 1 and a hydrate decomposer 3 was included. The hydration reactor 1 was constructed with the combination of a mist spray and sieve plates. The upper part of the reactor was the mist spray area equipped with sprayers 13 and a set of serpentine cooling pipes 9. The lower part of the reactor was the sieve plates area equipped with sieve plates 10. The internal upper part of the hydrate decomposer 3 was equipped with wire mesh demisters 15. A high pressure separator was connected with the inlet 11 of raw gases at the lower part of the sieve plates area of the hydration reactor via heat exchanger 4; the outlet 12 of hydrate slurry at the bottom of the hydration reactor was connected with the inlet 17 of hydrate slurry of the hydrate decomposer via heat exchanger 2; the outlet 7 of hydrogen with high concentration (rich hydrogen) at the top of the hydration reactor was connected with the recycle hydrogen compressor; the outlet 16 of water-in-oil microemulsion at the bottom of the hydrate decomposer was connected with the inlet 8 of water-in-oil microemulsion of the hydrate decomposer via heat exchanger 5 and booster pump 6; the outlet 14 at the top of the hydrate decomposer was connected with the fuel gas system. All the heat exchangers were shell and tube countercurrent heat exchangers. The tube passes of heat exchanger 2 was for the passing of hot water with the inlet temperature of hot water between 30° C. and 40° C.; the tube passes of heat exchanger 5 was for the passing of cryogens whose evaporating temperature was −3 to −5° C.; booster pump 6 was a volume measuring pump.

The composition of raw gases entering into the hydration separation unit (equivalent to the gases coming from the high pressure separator) was: $H_2$ (94 mol %)+$CH_4$(4 mol %)+$C_2H_6$ (2 mol %). The operating temperature of the hydration reactor was 1-5° C., the operating pressure was 18 MPa, the water-in-oil microemulsion was prepared with 3 volumes of water solution in which the mass concentration of tetrahydrofuran is 25% by weight and 7 volumes of diesel, the microemulsion/gas flux ratio was 1/100 (standard V/V), and the gases stay in the reactor for 15 min. After the concentration of hydrogen was increased, the gases contained $H_2$ (98 mol %)+$CH_4$(1.8 mol %)+$C_2H_6$(0.2 mol %). The concentration of hydrogen in the mixture of concentration-increased gases and raw gases (mixed in the volume ratio of 1:3) was in amount of 95%, indicating that of the gases coming from the high pressure separator, mixing of 25% which had experienced the increase of concentration in the hydration separation unit, with the remaining 75%, could yield a 95% concentration of recycle hydrogen. If passing through the hydrocracking reactor once, the concentration of the recycle hydrogen was only lowered by 1%, the concentration of recycle hydrogen could be maintained at 95% with said method in which the 25% of the recycle hydrogen had experienced concentration-increase by hydration.

Example 2

The same equipments are employed as in example 1 except that

The composition of raw gases entering into the hydration separation unit (equivalent to the gases from the high pressure separator) was: $H_2$ (93 mol %)+$CH_4$(5 mol %)+$C_2H_6$ (2 mol %). The operating temperature of the hydration reactor was 1-5° C. with 18 MPa of the operating pressure. The water-in-oil microemulsion was prepared with 3 volumes of water solution in which the mass concentration of tetrahydrofuran was 21% by mass and 7 volumes of diesel, the microemulsion/gas flux ratio was 1/100 (standard V/V), and the gases stayed in the reactor for 18 minutes. After the concentration of hydrogen was increased, the gases contained $H_2$ (97.5 mol %)+$CH_4$(2.2 mol %)+$C_2H_6$(0.3 mol %). The concentration of hydrogen in the mixture of concentration-increased gases and raw gases (mixed in the volume ratio of 1:1) showed 95.2%, indicating that of the gases coming from the high pressure separator, mixing of 50% which had experienced the increase of concentration in the hydration separation unit, with the remaining 50%, could yield a 95% concentration of recycle hydrogen. If passing through the hydrocracking reactor once, the concentration of the recycle hydrogen was only lowered by 2%, the concentration of recycle hydrogen could be maintained at 95% or higher with said method in which the 50% of the recycle hydrogen had experienced concentration-increase by hydration.

Example 3

The same equipments are employed as those in example 1 except that:

The composition of raw gases entering into the hydration separation unit (equivalent to the gases from the high pressure separator) was: $H_2$ (90 mol %)+$CH_4$(7 mol %)+$C_2H_6$ (3 mol %). The operating temperature of the hydration reactor was 1-5° C., the operating pressure was 15 MPa, the water-in-oil microemulsion was prepared with 3 volumes of water solution in which the mass concentration of tetrahydrofuran was 21% by mass and 7 volumes of diesel, the microemulsion/gas flux ratio was 1/100 (standard V/V), and the gases were kept in the reactor for 18 minutes. After the concentration of hydrogen was increased, the gases contained: $H_2$ (97.0 mol %)+$CH_4$(2.5 mol %)+$C_2H_6$(0.5 mol %). The concentration of hydrogen in the mixed gases of concentration-increased gases and raw gases (mixed in the volume ratio of 5:2) was 95.0%, indicating that of the gases coming from the high pressure separator, mixing of 71% which had experienced the increase of concentration in the hydration separation unit, with the remaining 29% could yield a 95% concentration of recycle hydrogen. If passing through the hydrocracking reactor once, the concentration of the recycle hydrogen was lowered by 5%, the concentration of recycle hydrogen could be maintained at 95% or higher with said method in which the 71% of the recycle hydrogen had experienced concentration-increase by hydrogenation.

Example 4

The same equipment is employed as that in example 1 except that:

The composition of raw gases entering into the hydration separation unit (equivalent to the gases from the high pressure separator) was: $H_2$ (85 mol %)+$CH_4$(10 mol %)+$C_2H_6$ (3 mol %)+$C_3H_8$ (2 mol %). The operating temperature of the hydration reactor was 1-5° C., the operating pressure was 8 MPa, the water-in-oil microemulsion was prepared with 2.5 volume of water and 7.5 volume of oil in which the mass concentration of cyclopentane and kerosene was 67% and 33% respectively, the microemulsion/gas flux ratio was 1/140 (standard V/V), and the gases were kept in the reactor for 20 minutes. After the concentration of hydrogen was increased, the gases contained: $H_2$ (95.1 mol %)+$CH_4$(3.2 mol %)+$C_2H_6$ (1.6 mol %)+$C_3H_8$ (0.1 mol %). This indicated that 100% of the gases coming from the high-pressure separator, after entering into the hydration separation unit and the concentration increased, could yield a 95% or higher concentration of recycle hydrogen. If passing trough the hydrocracking reactor once, the concentration of the recycle hydrogen was lowered by 10%, the concentration of recycle hydrogen could be maintained at 95% or higher with said method in which the 100% of the recycle hydrogen had experienced concentration-increase by hydration.

What is claimed is:

1. An apparatus for increasing the concentration of recycled hydrogen in a high pressure hydrogenation unit comprising:
   a hydrocracking reactor and a high pressure separator, the outlet of the hydrocracking reactor being fluid-connected with the inlet of said high pressure separator, the outlet of said high pressure separator being fluid-connected with the inlet of said hydrocracking reactor forming a fluid flow-loop, wherein
   a hydration separation unit is provided in the path of the fluid flow from said high pressure separator to the hydrocracking reactor, said hydration separation unit having
   a hydration reactor for receiving a water-in-oil microemulsion wherein the light components of the hydrocracking products are combined in said water-in-oil microemulsion; and
   a hydrate decomposer being connected with said hydration reactor to form a fluid flow-loop and decomposing the light components from said microemulsion which combines with said light components; and
   said hydration reactor is constructed with a combination of a mist spray area and sieve plates area, and the upper part of said hydration reactor is the mist spray area which is equipped with a sprayer for spurting out the water-in-oil microemulsion and a set of serpentine cooling pipes, and the lower part of said hydration reactor is the sieve plate area equipped with multiple layers of sieve plates.

2. The apparatus for increasing the concentration of recycled hydrogen in high pressure hydrogenation reactor according to claim 1, wherein the upper part of the internal of said hydrate decomposer is equipped with wire mesh demisters.

3. The apparatus for increasing the concentration of recycled hydrogen in high pressure hydrogenation reactor according to claim 1, wherein:
   said high-pressure separator is connected with a raw gas inlet at the lower part of the sieve plate area of the hydration reactor via a first heat exchanger;
   a hydrate slurry outlet at the bottom part of the hydration reactor is connected with a hydrate slurry inlet of the hydrate decomposer via said first heat exchanger and a secondary heat exchanger;
   an outlet of hydrogen with high concentration at the top of the hydration reactor is connected with a circulation hydrogen compressor;
   an outlet of water-in-oil microemulsion at the bottom of the hydrate decomposer is connected with a sprayer inlet of water-in-oil microemulsion at the top part of the hydration reactor via a third heat exchanger and a booster pump; and
   the top part of the hydrate decomposer is connected with a fuel gas system.

* * * * *